United States Patent
Inoue et al.

(10) Patent No.: US 7,346,006 B2
(45) Date of Patent: Mar. 18, 2008

(54) FRAME DATA TRANSMISSION SYSTEM HAVING POWER SAVE STRUCTURE

(75) Inventors: Gorou Inoue, Oobu (JP); Akihiro Sasaki, Anjo (JP); Kentaro Asai, Anjo (JP)

(73) Assignee: DENSO CORPORATION, Kariya (JP)

( * ) Notice: Subject to any disclaimer, the term of this patent is extended or adjusted under 35 U.S.C. 154(b) by 961 days.

(21) Appl. No.: 10/365,388

(22) Filed: Feb. 13, 2003

(65) Prior Publication Data

US 2003/0156551 A1    Aug. 21, 2003

(30) Foreign Application Priority Data

Feb. 15, 2002    (JP)    ............................ 2002-038372

(51) Int. Cl.
  *H04L 3/14*    (2006.01)
(52) U.S. Cl. ........................................ 370/252; 370/389
(58) Field of Classification Search ................ 370/252, 370/253, 389, 392, 394
  See application file for complete search history.

(56) References Cited

U.S. PATENT DOCUMENTS

| | | | |
|---|---|---|---|
| 5,081,621 A * | 1/1992 | Sugimoto | 370/401 |
| 5,430,740 A | 7/1995 | Kivari et al. | 714/782 |
| 5,886,645 A | 3/1999 | Eaton | 340/825.44 |
| 6,230,134 B1 * | 5/2001 | Kynast et al. | 704/270 |
| 6,292,470 B1 | 9/2001 | Uota | 370/252 |
| 6,678,854 B1 * | 1/2004 | Irvin | 714/752 |
| 6,714,540 B1 * | 3/2004 | Ogawa et al. | 370/389 |
| 2004/0088511 A1 * | 5/2004 | Bacon et al. | 711/167 |

FOREIGN PATENT DOCUMENTS

| | | |
|---|---|---|
| EP | 944217 | 9/1999 |
| EP | 1160990 | 12/2001 |
| FR | 2659457 | 9/1991 |
| JP | A-61-224052 | 10/1986 |
| JP | A-6-077974 | 3/1994 |
| JP | A-7-240758 | 9/1995 |
| WO | WO 8603318 | 6/1986 |
| WO | WO 9725786 | 7/1997 |

OTHER PUBLICATIONS

First Office Action issued from Japanese Patent Office Dispatched on Aug. 8, 2005 for the corresponding Japanese patent application No. 2002-038372 (a copy and English translation thereof).

* cited by examiner

*Primary Examiner*—Wing Chan
*Assistant Examiner*—Saba Tsegaye
(74) *Attorney, Agent, or Firm*—Posz Law Group, PLC

(57) ABSTRACT

A transmission system is provided which includes a transmitter working to transmit data on a frame basis and a receiver. If two frames having the same data are inputted in sequence to the receiver, the receiver decides that it is unnecessary to decode a following one of the frames and stops receiving or decoding it. This results in decreases in operation load and power consumption of the receiver.

6 Claims, 9 Drawing Sheets

FIG. 1
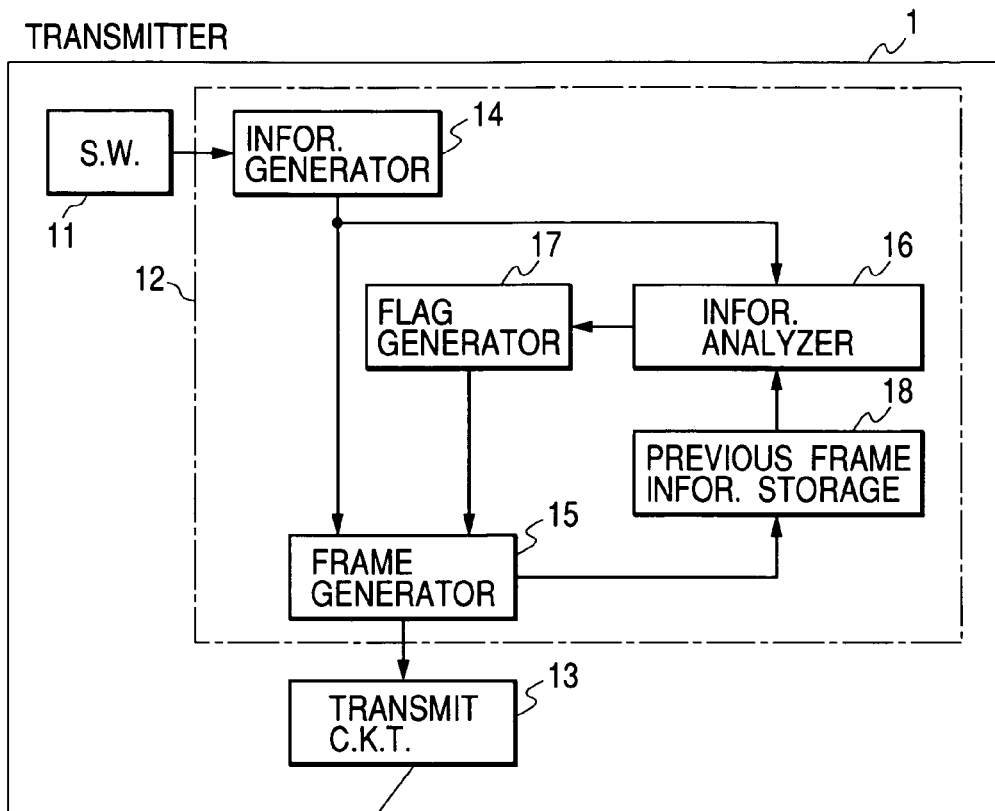
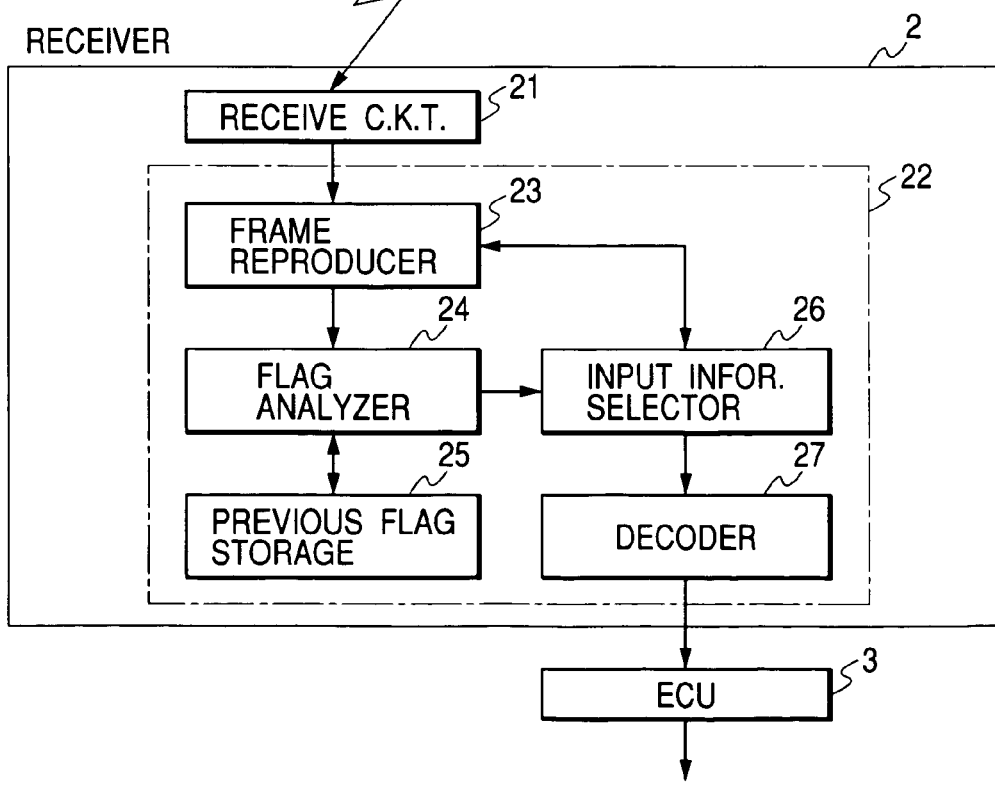

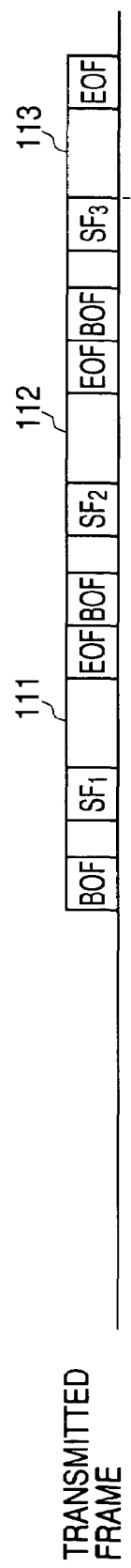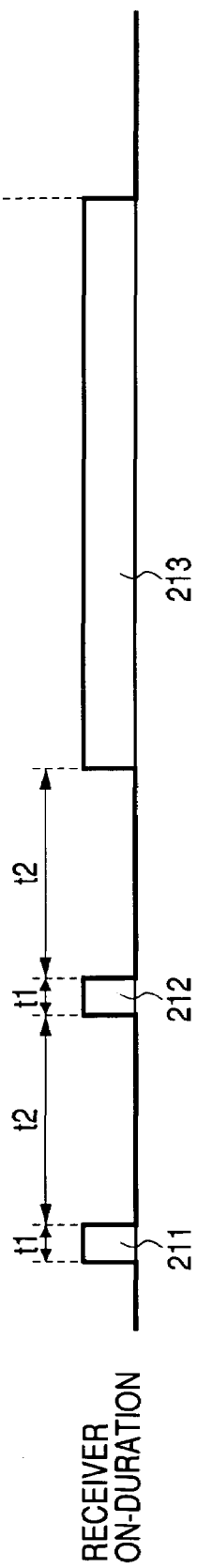

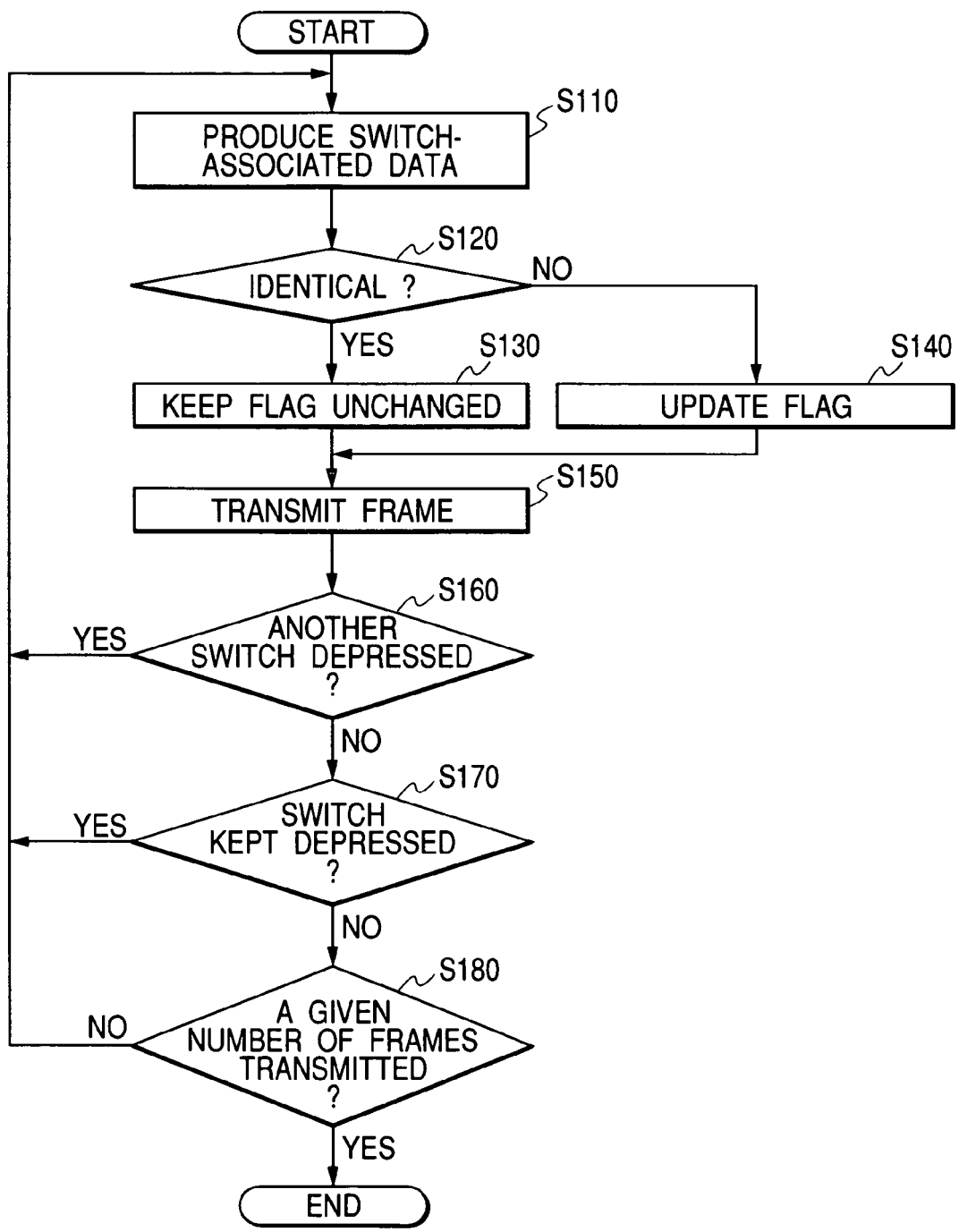

FRAME DATA TRANSMISSION SYSTEM HAVING POWER SAVE STRUCTURE

BACKGROUND OF THE INVENTION

1 Technical Field of the Invention

The present invention relates generally to a transmission system working to transmit data on a frame basis, and more particularly to an improved structure of such a system designed to provide lowered operation load and power consumption and a receiver which may be employed in the transmission system.

2 Background Art

As one of data transmitting techniques, there is known a transmission system which works to transmit data on a frame basis and is in widespread use in various wire and wireless data transmission applications.

For instance, automotive keyless entry systems are used which actuate a door lock mechanism of a vehicle from a remote location using a wireless remote controller to lock or unlock doors of the vehicle. Keyless entry systems of such a type typically work to frame and output command data on door locking or unlocking from a portable transmitter to a receiver which is installed in the vehicle and works to decode the data in the received frame. An electronic control unit installed in the vehicle receives the decoded data from the receiver and actuates the door lock mechanism.

The receiver installed in the vehicle is usually actuated by power supplied from a storage battery mounted in the vehicle and adapted to be turned on intermittently in order to minimize a decrease in available capacity in the battery. Accordingly, the time at which the receiver is turned on in a cycle may not match the time at which data is outputted from the transmitter. If such an event occurs, it may cause the receiver to receive an output from the transmitter from the middle thereof.

Even if the receiver has received a frame outputted from the transmitter completely during the on-mode thereof, electromagnetic noises may result in data emission from the frame, thus leading to a malfunction of the system.

In order to avoid the above problem, typical keyless entry systems are adapted to transmit a plurality of same frames (e.g., three same frames) in sequence on each one-time actuation of a switch of the transmitter and, when the receiver has received one of the frames completely, executes a task provided by data in the frame. The system, however, continues to decode data as long as frames are received subsequently. This is because data of frames outputted in sequence from the transmitter may be altered, for example, in a case where an operator re-depresses a door-unlocking switch on the portable transmitter just after depressing a door-locking switch. Moreover, in a case where the system is designed to perform a function to close windows of the doors when the door-locking switch is held depressed for a time, it is necessary to monitor whether same frames have been outputted in sequence from the transmitter for a given period of time or not. The receiver, thus, decodes data each time it receives one of the series of frames. This may, therefore, result in increases in operation load and power consumption of the system or impinge upon processing of another task.

SUMMARY OF THE INVENTION

It is therefore a principal object of the invention to avoid the disadvantages of the prior art.

It is another object of the invention to provide a transmission system which works to transmit data on a frame basis from a transmitter and decode the data in a receiver and which is designed to provide lowered operation load and power consumption.

According to one aspect of the invention, there is provided a transmission system which may be employed in an automotive keyless entry system. The transmission system comprises a transmitter and a receiver. The transmitter works to produce and transmit a plurality of data on a frame basis. The transmitter is designed to append a frame identification code to each frame for identifying the data in the frame. The receiver works to receive the frames outputted from the transmitter to decode the data in each of the frames. The receiver checks the frame identification code appended to each of the frames and determines whether a second received frame that is one of the frames received last is identical in data with a first received frame that is one of the frames received preceding the second received frame or not. If it is determined that the second received frame is identical with the first received frame, the receiver stops decoding the data in the second received frame.

Specifically, the data in the first received frame is already known at a time when the second received frame is received. Thus, when it is found that the second received frame is identical in data with the first received frame, it becomes possible to use the data in the first received frame without need for decoding the second received frame. This results in decreases in operation load and power consumption of the receiver.

The determination of whether the second received frame is identical with the first received frame or not may be accomplished by monitoring only the frame identification code of the second received frame which indicates the identify of the second received frame with the first received frame or by comparing values of the frame identification codes of the first and second received frame.

Further, the analysis of each of the frame identification codes may be performed after the whole of a corresponding one of the frames is received or decoded or upon reception of the frame identification code. For instance, upon reception of the frame identification code of the second received frame, it may be determined whether the second received frame is identical with the first received frame.

When it is found that the frame identification code of the second received frame indicates that the second received frame is identical in data with the first received frame upon reception of the frame identification code of the second received frame, the receiver may stop receiving a portion of the second received frame following the frame identification code. This results in further decreased operation load and power consumption of the receiver.

The frame identification code may be appended to a leading end of each of the frames. This allows the analysis of each of the frame identification codes to be performed just after reception of a corresponding one of the frames. Thus, it is possible to determine whether the second received frame is identical with the first received frame or not just after reception of the second received frame, thereby permitting the receiver to stop receiving the second received frame immediately.

The transmitter may be designed to produce the frames each of which is made up of a plurality of blocks each holding a data item therein and has a block identification code appended to each of the blocks for identifying the data item in the block. The receiver may work to check the block identification codes to determine whether or not a first block that is one of the blocks of the second received frame is identical in the data item with a second block that is a corresponding one of the blocks of the first received frame. If it is determined that the second received frame is different in data from the first received frame, while it is determined that the first block is identical with the second block, the receiver may stop decoding the data item in the first block. Specifically, when the second received frame is different from the first received frame as a whole, but they are identical in portions thereof, the identical portion of the first received frame can be used instead of the identical portion of the second received frame, thereby resulting in a further decreased decoding load.

According to the second aspect of the invention, there is provided a transmission system which comprises: (a) a transmitter working to produce and transmit a plurality of data on a frame basis, the transmitter being designed to append a frame identification code to a leading portion of each frame for identifying the data in the frame; and (b) a receiver working to receive the frames outputted from the transmitter to decode the data in each of the frames. The receiver checks the frame identification code appended to each of the frames and determines whether a second received frame that is one of the frames received last is identical in data with a first received frame that is one of the frames received preceding the second received frame or not. When the receiver has received the first received frame from a middle portion thereof and started to receive the second received frame, and if it is determined that the second received frame is identical with the first received frame, the receiver combines a frame trailing portion that is a section of the first received frame from the middle portion to a trailing end thereof with a frame leading portion that is a section of the second received frame from a leading end to a portion thereof corresponding to a portion of the first received frame preceding the middle portion to produce a duplication of the first and second received frames. This results in a decreased decoding load, thus leading to a decease in power consumption of the receiver.

In the preferred mode of the invention, the transmitter also appends the frame identification code to a trailing portion of each of the frames. When a first transmission frame that is one of the frames before transmitted by the transmitter is identical in data with a second transmission frame that is one of the frames having been transmitted already, the transmitter appends the frame identification codes to the leading and trailing portions of the first transmission frame which are identical with the frame identification codes appended to the second transmission frame. When the receiver has received the second transmission frame as the first received frame and started to receive the first transmission frame from a middle portion thereof as the second received frame, the receiver compares the frame identification code appended to the trailing portion of the first received frame with that appended to the leading portion of the second received frame and, if the former and latter frame identification codes are identical with each other, produces the duplication of the first and second received frames.

The transmitter also appends an error check code to each of the frames. The receiver works to check the duplication of the first and second received frames for an error using the error check code. When the error is detected, the receiver invalidates the duplication and continues to receive a portion of the second received from following the frame leading portion thereof. This results in improved reliability of the duplication of the first and second received frames.

According to the third aspect of the invention, there is provided a receiver for use in a transmission system which comprises: (a) a receiving circuit working to receive data transmitted from a transmitter on a frame basis, each frame having a frame identification code appended thereto for identifying the data in the frame; (b) a decoder working to decode the data in each frame received by the receiving circuit and output the decoded data; (c) a frame identity-determining circuit working to monitor the frame identification code appended to each of the frames to determine whether a second received frame that is one of the frames received last is identical in data with a first received frame that is one of the frames received preceding the second received frame or not; and (d) a frame decoding disenabling circuit working to disenable the decoder to decode the data in the second received frame if it is determined that the second received frame is identical with the first received frame and make the decoder output data equivalent to the decoded data of the first received frame.

In the preferred mode of the invention, when the second received frame is received up to the frame identification code thereof, the frame decoding disenabling circuit determines whether the second received frame is identical in data with the first received frame or not. The receiver further includes a reception prohibiting circuit working to prohibit the receiving circuit from receiving a portion of the second received frame following the frame identification code thereof when the frame identity-determining circuit determines that the second received frame is identical with the first received frame.

According to the fourth aspect of the invention, there is provided a receiver for use in a transmission system which comprises: (a) a receiving circuit working to receive data transmitted from a transmitter on a frame basis, each frame having a frame identification code appended thereto for identifying the data in the frame and being made up of a plurality of blocks each of which holds a data item therein and has a block identification code appended thereto for identifying the data item in the block; (b) a decoder working to decode the data in each frame received by the receiving circuit and output the decoded data; (c) a frame identity-determining circuit working to monitor the frame identification code appended to each of the frames to determine whether a second received frame that is one of the frames received last is identical in data with a first received frame that is one of the frames received preceding the second received frame or not; (d) a frame decoding disenabling circuit working to disenable the decoder to decode the data in the second received frame if the frame identify-determining circuit determines that the second received frame is identical with the first received frame and make the decoder output data equivalent to the decoded data of the first received frame; (e) a block identity-determining circuit working to monitor the block identification code appended to each of the blocks to determine whether a first block that is one of the blocks of the second received frame is identical in data item with a second block that is a corresponding one of the blocks of the first received frame or not; and (f) a block decoding disenabling circuit working to disenable the decoder to decode the data item in the first block if the block identify-determining circuit determines that the first block is identical with the second block and make the decoder output a data item equivalent to a data item of the second block decoded by the decoder.

According to the fifth aspect of the invention, there is provided a receiver for use in a transmission system which comprises: (a) a receiving circuit working to receive data transmitted from a transmitter on a frame basis, each frame having a frame identification code appended to a leading portion thereof for identifying the data in the frame; (b) a decoder working to decode the data in each frame received by the receiving circuit and output the decoded data; (c) a frame identify-determining circuit which, when the receiving circuit has received one of the frames from a middle portion thereof and started to receive a following one of the frame, determines whether a second received frame that is the following one of the frames is identical in data with a second received frame that is the one of the frames received preceding the second received frame or not using the frame identification codes appended to the first and second received frames; (d) a frame holding circuit working to hold a frame trailing portion that is a section of the first received frame from the middle portion to a trailing end thereof; and (e) a frame reproducing circuit which, when the frame identify-determining circuit determines that the second received frame is identical with the first received frame, combines a frame trailing portion that is a section of the first received frame from the middle portion to a trailing end thereof with a frame leading portion that is a section of the second received frame from a leading end to a portion thereof corresponding to a portion of the first received frame preceding the middle portion to produce a duplication of the first and second received frames which is to be decoded by the decoder.

In the preferred mode of the invention, each of the frames has the frame identification code appended to a trailing portion thereof. When a first transmission frame that is one of the frames before transmitted from the transmitter is identical in data with a second transmission frame that is one of the frames having been transmitted already, the frame identification codes are appended to the leading and trailing portions of the first transmission frame which are identical with the frame identification codes appended to the second transmission frame. When the receiving circuit has received the second transmission frame as the first received frame and started to receive the first transmission frame from a middle portion thereof as the second received frame, the frame identify-determining circuit compares the frame identification code appended to the trailing portion of the first received frame with that appended to the leading portion of the second received frame. If it is determined that the former and latter frame identification codes are identical with each other, the frame reproducing circuit produces the duplication of the first and second received frames.

An error check code is also appended to each of the frames. The receiver further includes an error checking circuit working to check the duplication of the first and second received frames for an error using the error check code. When the error is detected, the duplication is invalidated, and the receiving circuit continues to receive a portion of the second received from following the frame leading portion thereof. This results in improved reliability of the duplication.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings:

FIG. 1 is a block diagram which shows an automotive keyless entry system according to the first embodiment of the invention;

FIG. 2(a) is an illustration which shows structures of frames to be outputted from a transmitter of the system of FIG. 1;

FIG. 2(b) is an illustration which shows an ON-duration of a receiver provided cyclically;

FIG. 3 is a flowchart of a program executed by a transmitter to produce and transmit a frame;

DESCRIPTION OF THE PREFERRED EMBODIMENTS

Figure 4:
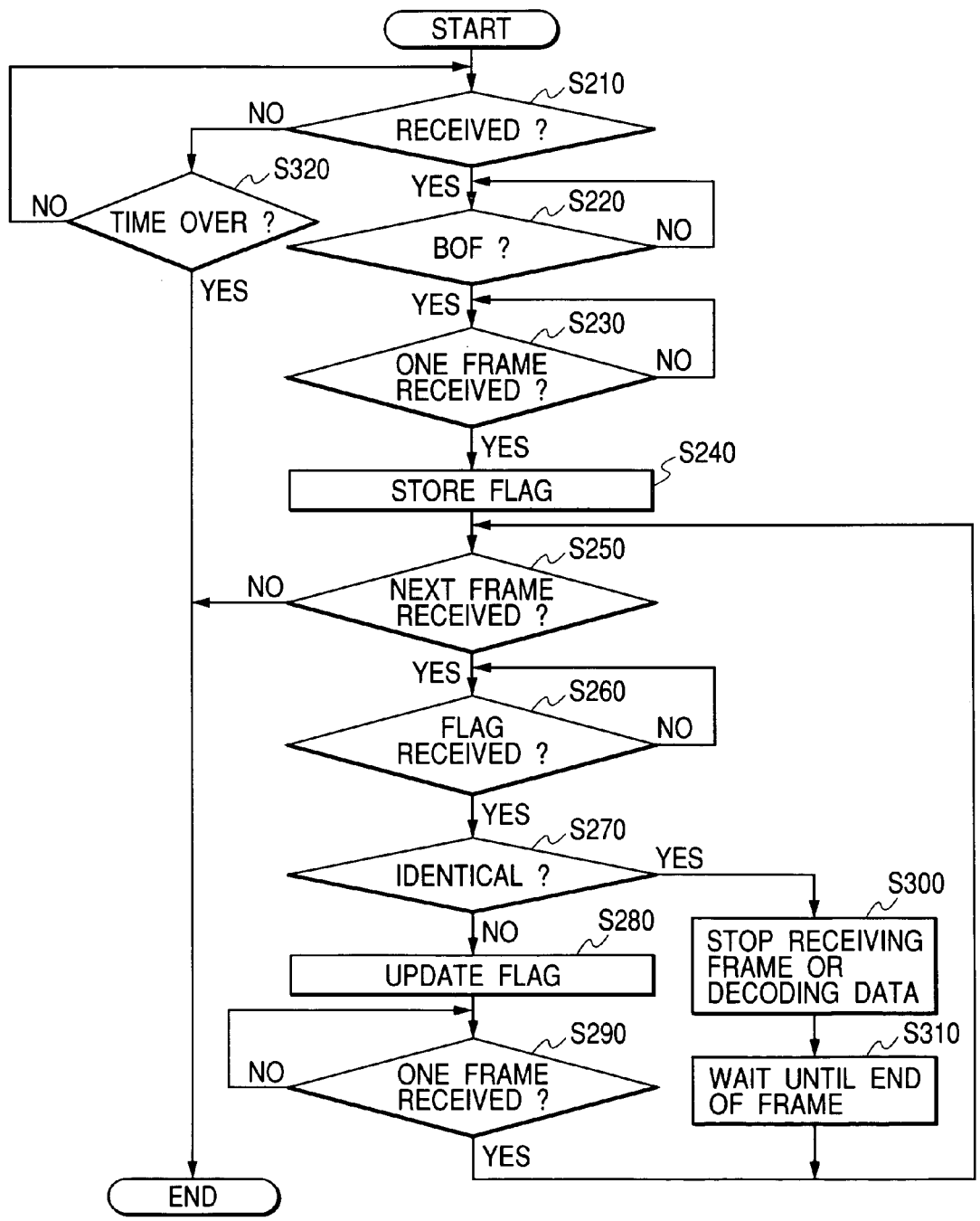
FIG. 4 is a flowchart of a program executed by a receiver to receive and decode a frame outputted from a transmitter.

Referring to the drawings, wherein like reference numbers refer to like parts in several views, particularly to FIG. 1, there is shown an automobile keyless entry system of the first embodiment of the invention which is designed to actuate a door locking/unlocking mechanism installed in a vehicle through a wireless remote control to lock or unlock doors of the vehicle from a remote location. The keyless entry system consists essentially of transmitter 1, a receiver 2, and an in-vehicle ECU 3.

The transmitter 1 is of a portable type carried by a user or vehicle operator. The transmitter 1 includes a function switch array 11, a microcomputer 12, and a transmitting circuit 13. The function switch array 11 is made up of a plurality of push button operating switches (not shown) which work to perform door-locking, door-unlocking, trunk-opening functions, etc. The function switch array 11 is also designed to perform a switch hold function which closes, for example, windows when the door-locking operating switch is held depressed for a time.

The microcomputer 12 includes an information generator 14, a frame generator 15, an information analyzing circuit 16, a status flag generator 17, and a previous frame information storage 18. The information generator 14 is responsive to an output from the function switch array 11 to produce and output corresponding information to the frame generator 15 and the information analyzing circuit 16. When the operating switch of the function switch array 11 is depressed or actuated one time, the frame generator 15 produces three same frame, as will be discussed later in detail, and outputs them to the transmitting circuit 13.

The previous frame information storage 18 stores therein data in the frame produced by the frame generator 15 each time it is outputted to the transmitting circuit 13. Every time new data is inputted to the previous frame information storage 18, the content of stored data is updated. The information analyzing circuit 16 compares the data stored in the previous frame information storage 18 with one inputted from the information generator 14 and outputs a result of such comparison to the status flag generator 17.

Specifically, the information analyzing circuit 16 determines whether or not the data to be framed now in the frame generator 15 is identical with that produced already in a previous operation of the frame generator 15 and outputted to the transmitting circuit 13 and outputs a result of such determination to the status flag generator 17.

The status flag generator 17 works to produce, as a frame ID (identification) code, the status flag which is used in determining, as will be described later in detail, whether the data outputted last by the information generator 14 is identical with that outputted previously and outputs it to the frame generator 15. The frame generator 15 adds the status flag to the data inputted from the information generator 14 and frames it.

The status flag is expressed in one bit. If the data to be framed and outputted is identical with that outputted already in the previous operation, the status flag generator 17 outputs the same status flag as that added to the previous frame to the frame generator 15. For instance, in a case where a status flag of one (1) was added to the frame produced previously, if the data to be transmitted now is identical with that of the frame outputted previously, a status flag to be added to the data is set to one (1). If not, the status flag is set to zero (0).

The status flag may alternatively be formed by a plurality of bits which represent a value to be incremented whenever a frame is produced which is different in data from that outputted previously.

The frame produced by the frame generator 15 is transmitted from the transmitting circuit 13 through a radio wave. FIG. 2(a) illustrates an example of three frames produced in sequence by the frame generator 15 when one of the operating switches of the function switch array 15 is actuated by snap action. Each of the frames 111, 112, and 113 includes beginning-of-frame (BOF) and end-of-frame (EOF) delimiters and the status flag SF. The BOF and EOF delimiters are appended to leading and trailing portions of each frame. The status flag SF is added to a specified portion of a data section.

The three frames 111, 112, and 113 all have the same data. The status flags $SF_1$, $SF_2$, and $SF_3$ thereof are, thus, identical. While FIG. 2(a) illustrates, as an example, a sequence of frames transmitted when each of the operating switches of the function switch array 11 is snapped depressed, when the operating switch is held depressed to perform the switch hold function, the same frames continue to be outputted until it is released.

Note that the BOF and EOF delimiters are added to each frame only for the purpose of indicating the beginning and end of the frame and thus not included in the data, as referred to throughout this specification. Specifically, the data, as referred to herein, is formed by a portion of the frame except the BOF and EOF delimiters and the status flag SF.

Note that the BOF and EOF delimiters, as described above, are typically added to the head and tail end of each frame, however, a leading and a trailing portion of each frame, as referred to throughout this specification, indicate end portions of the frame excluding the BOF and EOF delimiters for convenience.

Upon depression of any one of the operating switches of the function switch array 11, the microcomputer 12 starts to execute a frame production program in FIG. 3 to produce a sequence of frames, as illustrated in FIG. 2(a).

Upon entering the program, the routine proceeds to step 110 wherein the information generator 14 produces data associated with one of the operating switches of the function switch array 11 which has been depressed.

The routine proceeds to step 120 wherein it is determined whether the data produced in step 110 is identical with that contained in a frame which was produced and transmitted one program cycle earlier or not. If a YES answer is obtained, then the routine proceeds to step 130 wherein the same status flag as added to the previous frame is produced.

Alternatively, if a NO answer is obtained in step 140 wherein a status flag different from that added to the previous frame is produced. After step 130 or 140, the routine proceeds to step 150 wherein a frame made up of the data produced in step 110 and the status flag produced in step 130 or 140 is transmitted from the transmitting circuit 13.

The routine proceeds to step 160 wherein it is determined whether another operating switch has been depressed or not, that is whether the operator has made another request or not. If a YES answer is obtained, then the routine returns back to step 110. Alternatively, if a NO answer is obtained, then the routine proceeds to step 170 wherein it is determined whether the operating switch is kept depressed or not. If the operator keeps the operating switch depressed to perform the switch hold function, a YES answer is obtained, and the routine returns back to step 110. Specifically, a frame containing data associated with the switch hold function is outputted repeatedly as long as the operating switch is kept depressed. The same status flag is added to each of such a sequence of frames.

Alternatively, if a NO answer is obtained in step 170 meaning that the operating switch has been actuated by snap action, then the routine proceeds to step 180 wherein it is determined whether a given number of frames have been transmitted or not.

The system of this embodiment is, as already described, designed to produce three identical frames in sequence every actuation of each of the operating switches. Thus, in step 180, it is determined whether or not the number of times the same frame is transmitted has reached three (3) after one of the operating switch is depressed. If a NO answer is obtained, then the routine returns back to step 110. Alternatively, if a YES answer is obtained, then the routine terminates.

Referring back to FIG. 1, the receiver 2 is installed in the vehicle and works to decode data in a frame transmitted from the transmitter 1 through a radio wave and output it to the in-vehicle ECU 3. The receiver 2 consists essentially of a receiving circuit 21 and a microcomputer 22.

The receiving circuit 21 is of a known structure equipped with an antenna and a decoder and works to receive and decode an output from the transmitter 1 and transfer a decoded bit string to the microcomputer 22.

The microcomputer 22 is made up of a frame reproducing circuit 23, a flag analyzer 24, a previous flag storage 25, an input information selector 26, and a decoder 27. The frame reproducing circuit 23 is designed to reproduce a frame using a bit data inputted from the receiving circuit 21 (i.e., a duplication of a frame produced by the frame generator 15) and output it to the input information selector 26. The frame reproducing circuit 23 also provides a status flag contained in the reproduced frame to the flag analyzer 24. The flag analyzer 24 compares the status flag inputted from the frame reproducing circuit 23 with a status flag which was included in a frame received previously and stored in the previous flag storage 25 to determine whether they are identical with each other or not and outputs a result thereof to the input information selector 26. If it is determined that the status flags are different from each other, the flag analyzer 24 outputs the status flag inputted from the frame reproducing circuit 23 to the previous flag storage 25.

Upon input of the status flag from the flag analyzer 24, the previous flag storage 25 updates the status flag stored therein to the input one.

The input information selector 26 determines whether the frame inputted from the frame reproducing circuit 23 is to be used as it is or not based on the comparison result provided by the flag analyzer 24. Specifically, if the status flag contained in the frame reproduced by the frame reproducing circuit 23 is different from that stored in the previous flag storage 25, the input information selector 26 sends the frame inputted from the frame reproducing circuit 23 to the decoder 24 as it is. The decoder 27 decodes the input frame and outputs it to the in-vehicle ECU 3.

Alternatively, if the status flag contained in the frame reproduced by the frame reproducing circuit 23 is identical with shat stored in the previous flag storage 25, the input information selector 26 outputs a signal indicating that those status flags are the same meaning that data in the frame now received is identical with that in the frame received previously to the decoder 27 without outputting the frame provided by the frame reproducing circuit 23. Upon input of such a signal, the decoder 27 outputs a duplication of data decoded previously to the in-vehicle ECU 3.

The receiver 2 is actuated on power supplied from a storage battery (not shown) installed in the vehicle and designed to operate at a time interval t2, as shown in FIG. 2(b), in order to minimize a decrease in available power of the battery. Specifically, the receiver 2 operates for a period of time t1 and then rests for a period of time t2 in a cycle. However, when receiving an input from the transmitter 1 during the on-mode (i.e., the period of time t1), the receiver 2 continues to operate as long as frames are outputted in sequence from the transmitter 1. FIG. 2(b) illustrates an example wherein the receiver 2 did not receive any inputs from the transmitter 1 for on-times 211 and 212, but the transmitter 1 had started to output a frame immediately before an on-time 213 started, so that the receiver 2 had begun to receive the frame from the middle thereof and continued to operate until completion of transmission of frames. The receiver 2, unlike the prior art, continues to operate only until reception of the status flag $SF_3$ contained in the frame 113. Specifically, upon input of the status flag $SF_3$, the flag analyzer 24 determines that the status flag $SF_3$ is identical with the status flag $SF_2$ stored in the previous flag storage 25 meaning that there is no need for receiving data following the status flag $SF_3$. This operation will be described later in detail.

The ECU 3 is implemented by a control unit typically employed in automotive vehicles to control vehicle body components such as doors and works to execute one of given tasks associated with data decoded by the decoder 27. For instance, if the data decoded by the decoder 27 indicates an instruction to lock the doors of the vehicle, the ECU 3 turns on a door-locking actuator (not shown).

FIG. 4 shows a program executed by the microcomputer 22 of the receiver 2 when entering the on-mode cyclically.

After entering the program, the routine proceeds to step 210 wherein it is determined whether an output or frame from the transmitter 1 has been received or not. If a NO answer is obtained, then the routine proceeds to step 320 wherein it is determined whether a preselected period of time (i.e., the on-time duration t1 in FIG. 2(b)) has passed or not. If a NO answer is obtained, then the routine returns back to step 210. Alternatively, if a YES answer is obtained, then the routine terminates.

If a YES answer is obtained in step 210 meaning that a frame has been received during the on-time duration t1, the routine proceeds to step 220 wherein it is determined whether the received frame includes the BOF delimiter or not. If the receiving circuit 21 has received the frame from a head thereof, then the BOF delimiter contained therein is first detected. A YES answer is, thus, obtained in step 220. The routine proceeds to step 230. Alternatively, if the receiving circuit 21 has received the frame from the middle thereof as at the time of start of the on-time duration 213 illustrated in FIG. 2(b), then the BOF delimiter is not detected. A NO answer is, thus, obtained. The routine repeats step 220.

In step 230, it is determined whether the whole of the frame has been received or not. If the frame has been received up to the end thereof, then the routine proceeds to step 240 wherein the status flag in the frame is recorded in the previous flag storage 25. Note that after reception of one frame, data in the frame is decoded in another task.

After step 240, the routine proceeds to step 250 wherein it is determined whether a following frame has started to be received or not. If a NO answer is obtained meaning that another frame has not been received, then the routine terminates. Alternatively, if a YES answer is obtained, then the routine proceeds to step 260 wherein it is determined whether the status flag contained in the following frame has been detected or not.

If a YES answer is obtained in step 260, then the routine proceeds to step 270 wherein it is determined whether the status flag detected in step 260 is identical with that stored in the previous flag storage 25 in step 240 (i.e., the status flag contained in the immediately preceding frame) or not. If a YES answer is obtained meaning that those status flags are identical, that is, that the frame now being received is identical in data with that received previously, then the routine proceeds to step 300 wherein the decoder 27 is prohibited from decoding the data in the frame now being received, and the receiving circuit 21 is also prohibited from receiving a portion of the frame following the status flag detected in step 260. Specifically, the input information selector 26 stops the frame reproducing circuit 23 from receiving data from the receiving circuit 21 and outputs an information signal indicating that the same frame as received previously has been received to the decoder 27 to provide the same data as decoded previously to the ECU 3.

After step 300, the routine proceeds to step 310 and waits until completion of transmission of the latest frame from the transmitter 1. Subsequently, the routine returns back to step 250.

The suspension of receiving the frame in step 300 may alternatively be achieved by disenabling the receiver 21 itself. The standby time may be determined as a function of the length of the frame. For instance, if the frame has a fixed length, and a location of the status flag within the frame is known, it is possible to calculate the time required for receiving a portion of the frame following the status flag completely. The standby time may, therefore, be set to such a time. Alternatively, if the frame has a variable length, the length and location of the status flag may be monitored upon input of the frame to determine the standby time for use when a frame having the same length is inputted in future.

Further, instead of the suspension of receiving the frame in step 300, the frame may be received only to detect the EOF delimiter added thereto.

If a NO answer is obtained in step 270 meaning that the status flag detected in step 260 is different from that stored in the previous flag storage 25, then the routine proceeds to step 280 wherein the status flag stored in the previous flag storage 25 is updated to that detected in step 260. The routine proceeds to step 290 wherein it is determined, like step 230, whether the whole of the frame has been received or not. If the frame has been received up to the end thereof, then the routine returns back to step 250.

If the above described operation is performed at the start of the on-time duration 213 as illustrated in FIG. 2(*b*), the receiving circuit 21 receives the frame 111 from the middle thereof, so that the BOF delimiter contained in the frame 111 is not acquired, and the frame 111 is ignored. The receiving circuit 21 receives the whole of the second frame 112, so that data thereof is decoded by the decoder 27. The status flag $SF_2$ in the frame 112 is stored in the previous flag storage 25 in step 240.

Subsequently, when the receiving circuit 21 has received the third frame 113 up to the status flag $SF_3$, the microcomputer 22 determines in step 270 whether the status flags $SF_2$ and $SF_3$ are identical with each other or not. In this case, the status flags $SF_2$ and $SF_3$ are identical, the microcomputer 22 concludes that the frames 113 is equivalent in data to the frame 112 and stops receiving a portion of the frame 113 following the status flag $SF_3$.

As apparent from the above discussion, if two frames having the same data are inputted in sequence to the receiver 2 after start of the on-mode thereof, the receiver 2 stops receiving a following one of the frames after the status flag thereof is detected, thereby decreasing an operating load on the decoder 27, thus resulting in a decrease in power consumed by the receiver 2.

The keyless entry system of the second embodiment will be described below. The structure thereof is substantially identical with the one illustrated in FIG. 1, and explanation thereof in detail will be omitted here.

The frame generator 15 of the transmitter 1 is designed to produce frames, as clearly shown in FIG. 5(*a*), each having two status flags added to leading and trailing ends of a data section. Each frame has a fixed length. A portion of each frame except the BOF and EOF delimiters and the status flags (i.e., the data section) is expressed in n bits.

If the receiver 2 enters the on-mode and has started to receive, as shown in FIG. 5(*a*), the frame 121 from the $i_{(1)}$th bit position within the data section, it holds in a memory a portion of the frame 121 from the $i_{(1)}$th bit position to the EOF delimiter as a frame trailing half. Subsequently, if the following frame 122 is identical in data with the frame 121, the receiver 2 works to receive a portion of the frame 122 from the BOF delimiter to the $i-1_{(2)}$th bit position immediately following the $i_{(1)}$th bit position as a frame leading half and combines, as shown in FIG. 5(*b*), the frame leading and trailing halves to produce a duplication of the frames 121 and 122. This operation will be described below in detail with reference to FIGS. 5 and 6.

Figure 6:
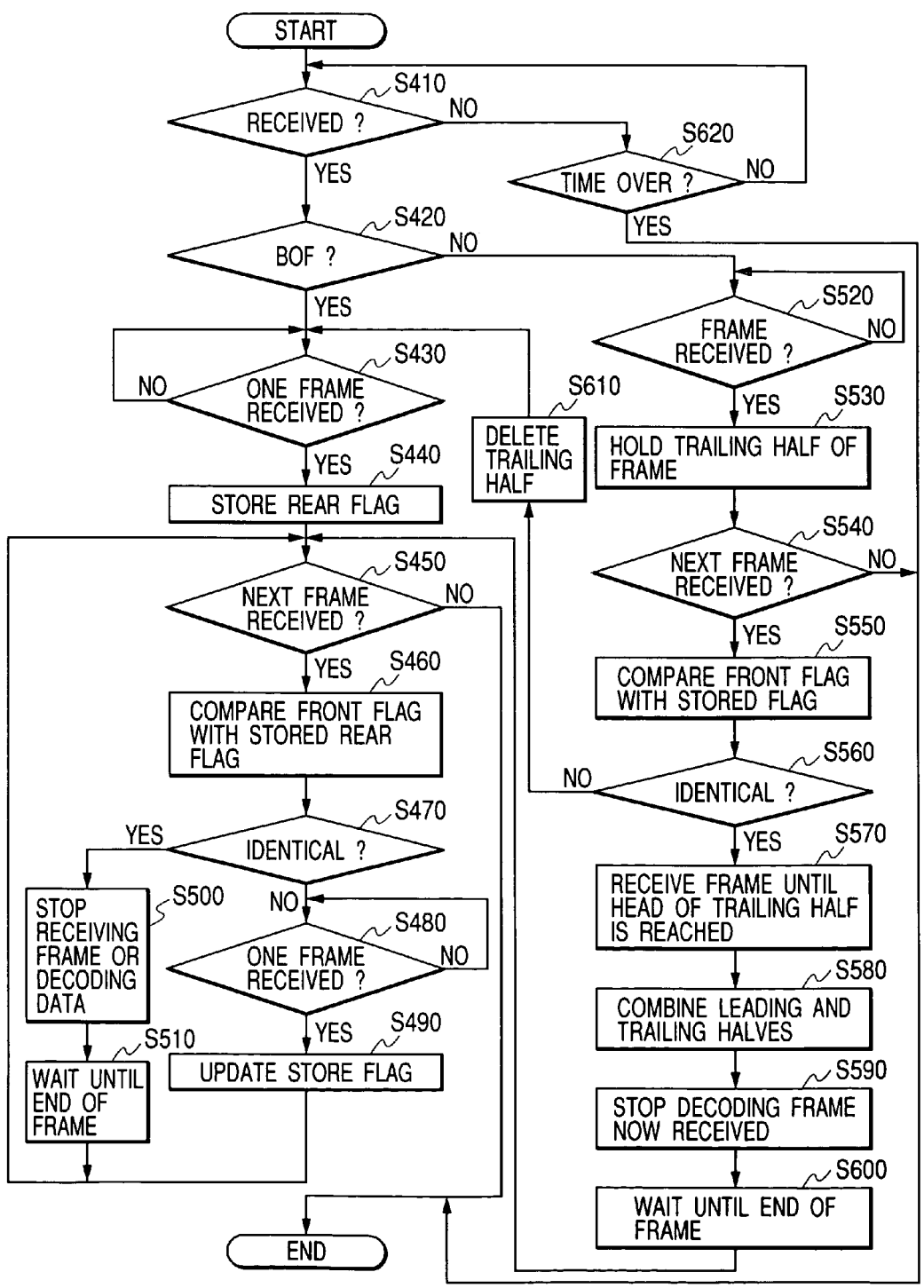
FIG. 6 is a flowchart of a program executed by a receiver of the second embodiment of the invention.

FIG. 6 shows a program executed by the microcomputer 22 of the receiver 2 when entering the ON-mode cyclically.

After entering the program, the routine proceeds to step 410 wherein it is determined whether an output or frame from the transmitter 1 has been received or not. If a NO answer is obtained, then the routine proceeds to step 620 wherein it is determined whether a preselected period of time (i.e., the on-time duration) has passed or not. If a NO answer is obtained, then the routine returns back to step 410. Alternatively, if a YES answer is obtained, then the routine terminates. Step 602 is identical in operation with step 320 in FIG. 4.

If a YES answer is obtained in step 410 meaning that a frame has been received during the on-time duration, the routine proceeds to step 420 wherein it is determined whether the received frame includes the BOF delimiter or not. If the receiving circuit 21 has received the frame from a head thereof, then the BOF delimiter contained therein is first detected. A YES answer is, thus, obtained in step 420. The routine proceeds to step 430. Alternatively, if the receiving circuit 21 has received the frame from the middle thereof as at the time of start of the on-time duration, then the BOF delimiter is not detected. A NO answer is, thus, obtained in step 420. The routine repeats step 520.

In step 430, it is determined whether the whole of the frame has been received or not. If the frame has been received up to the end thereof, then the routine proceeds to step 440 wherein the status flag added to a trailing portion of in the frame is recorded in the previous flag storage 25. If a NO answer is obtained in step 430, then the routine repeats step 430 and waits until the frame is received completely.

After step 440, the routine proceeds to step 450 wherein it is determined whether the receiving circuit 21 has started to receive a following frame or not. If a NO answer is obtained meaning that another frame has not been received, then the routine terminates. Alternatively, if a YES answer is obtained, then the routine proceeds to step 460 wherein the status flag added to a leading portion of the frame now being received is compared with the one stored in the previous flag storage 25.

The routine proceeds to step 470 wherein it is determined whether the status flag of the frame now being received is identical with the one stored in the previous flag storage 25 or not using a comparison result in step 460. If a YES answer is obtained meaning that the status flags are identical, then the routine proceeds to step 500 wherein the decoder 27 is prohibited from decoding the data in the frame now being received, and the receiving circuit 21 is also prohibited from receiving a portion of the frame following the status flag thereof. The routine proceeds to step 510 and waits until completion of transmission of the latest frame from the transmitter 1. Subsequently, the routine returns back to step 450. Steps 500 to 510 are identical in operation with steps 300 to 310 in FIG. 4.

If a NO answer is obtained in step 470 meaning that the status flag of the frame now being received is different from that of the frame received previously, then the routine proceeds to step 480 wherein it is determined whether the whole of the frame has been received completely or not. If the frame has been received up to the end thereof, then the routine proceeds to step 490 wherein the status flag stored in the previous flag storage 25 is updated to that of the latest frame.

If a NO answer is obtained in step 420 meaning that the receiving circuit 21 receives the frame from the middle thereof, then the routine proceeds to step 520. In the following discussion, it is assumed that the receiving circuit 21 has started to receive, as shown in FIG. 5(*a*), the frame 121 from the $i_{(1)}$th bit position within the data section thereof.

In step 502, it is determined whether the frame 121 has been received up to the end thereof or not. If a NO answer is obtained, the routine repeats step 520 and waits until the frame 121 has been received up to the end thereof. Alternatively, if a YES answer is obtained, then the routine proceeds to step 530 wherein a portion of the frame 121 from the $i_{(1)}$th bit position to the EOF delimiter is held as a frame trailing half, and the status flag $SF_1$ added to a trailing portion of the frame 121 is stored in the previous flag storage 25.

Subsequently, the routine proceeds to step 540 wherein it is determined whether the frame 122 immediately following the frame 121 has been started to be received or not. If a NO answer is obtained meaning that the receiver 2 has stopped receiving frames, then the routine terminates. Alternatively, if a YES answer is obtained, then the routine proceeds to step 550 wherein the status flag $SF_2$ added to a leading portion of the frame 122 having been started to be received is compared with the status flag $SF_1$ of the frame 121 stored in the previous flag storage 25. The routine proceeds to step 560 wherein it is determined whether the status flag $SF_2$ agrees with the status flag $SF_1$ or not using a comparison result in step 550. If a NO answer is obtained meaning that the frame 122 is different in data from the frame 121, the routine proceeds to step 610 wherein the frame trailing half held in step 530 is deleted. The routine then proceeds to step 430 as described above.

Figures 5A, 5B:
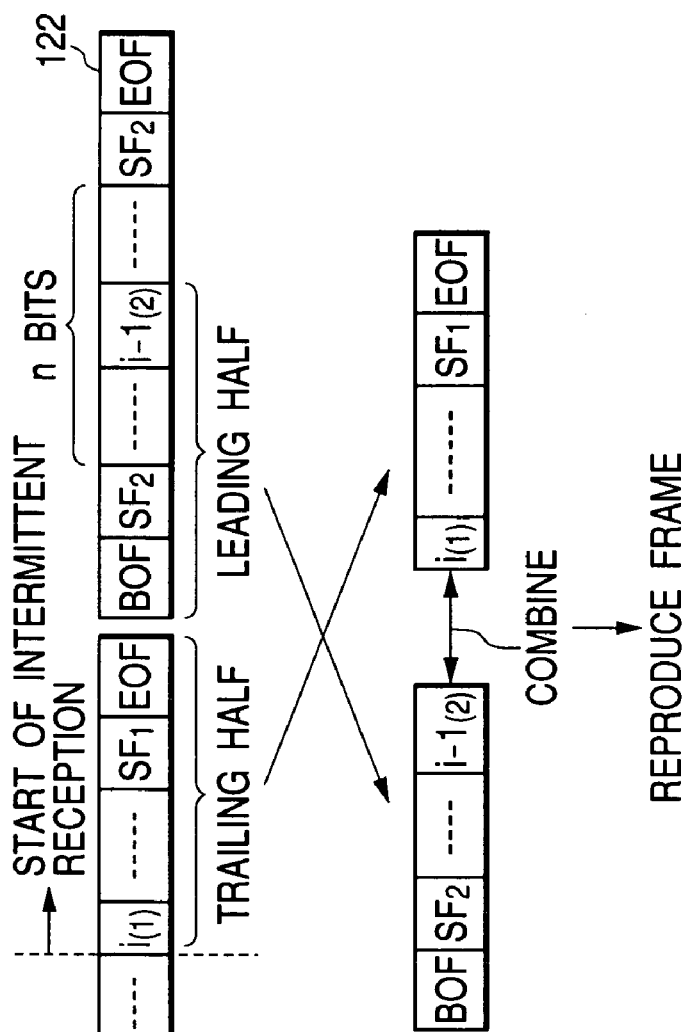
FIG. 5(a) is an illustration which shows structures of frames to be outputted from a transmitter of the second embodiment of the invention.
FIG. 5(b) is an illustration which shows a combination of portions of two frames to produce a duplication thereof in a receiver of the second embodiment of the invention.

If a YES answer is obtained in step 560 meaning that the frame 122 is identical in data with the frame 121, the routine proceeds to step 570 wherein a portion of the frame 122 from the BOF delimiter to the $i-1_{(2)}$th bit position is held as a frame leading half. The routine proceeds to step 580 wherein the frame trailing half of the frame 121 acquired in step 530 is combined with the frame leading portion of the frame 122 acquired in step 570 to produce, as shown in FIG. 5(b), a frame equivalent to the frames 121 and 122 which is decoded by the decoder 27 in another task.

After step 580, then the routine proceeds to step 590 wherein the decoder 27 is prohibited from decoding the data in the frame 122 now being received. The receiving circuit 21 may also be prohibited from receiving a portion of the frame 122 following the status flag $SF_2$.

The routine proceeds to step 600 and waits until completion of transmission of the frame 122 from the transmitter 1. Afterwards, the routine proceeds to step 450 as described above. Step 600 is identical in operation with step 310 of FIG. 4.

If another frame is received after reception of the frame 122, the routine proceeds from step 450 to step 460, however, if the reception stops, the routine terminates.

As apparent from the above discussion, in a case where the receiver 2 has received a frame from the middle thereof and started to receive a following frame which is identical in data with the former, the receiver 2 works to use portions of those frames to produce a replica thereof. This results in a greatly decreased operating load on the decoder 27, thus leading to a decrease in power consumption of the receiver 2 as compared with the system of the first embodiment, especially when the above condition is encountered. Further, it becomes possible to decode required data before the receiver 2 finishes receiving the following frame, thus enabling the ECU 3 to start to execute a task associated with the decoded data soon without having to wait for completion of reception of the following frame.

The keyless entry system of the third embodiment will be described below. The structure thereof is substantially identical with the one illustrated in FIG. 1, and explanation thereof in detail will be omitted here.

Figure 7:
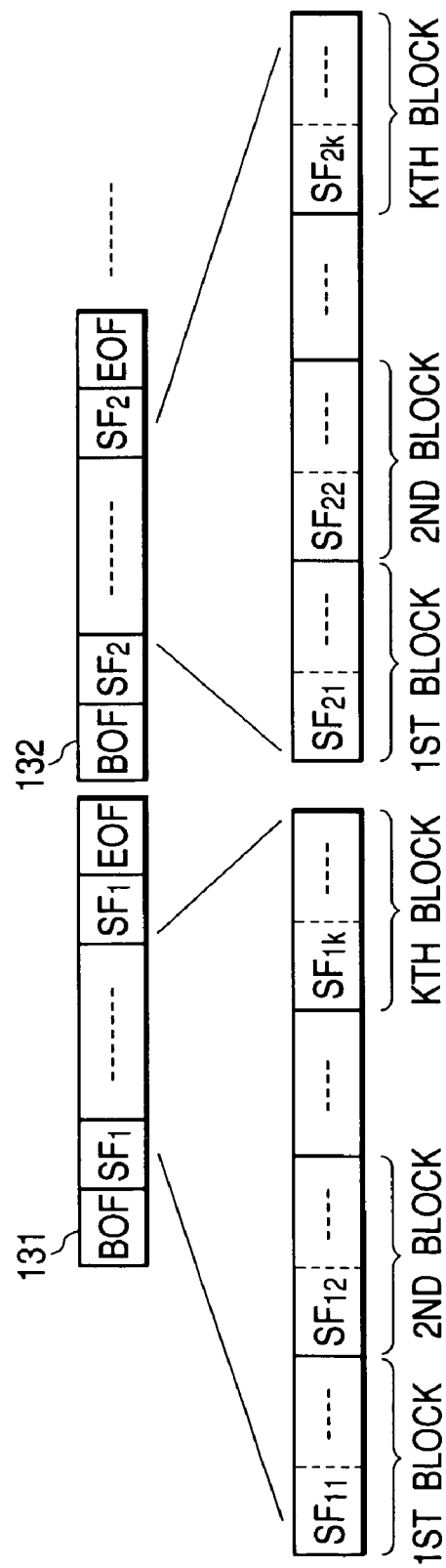
FIG. 7 is an illustration which shows structures of frames to be outputted from a transmitter of the third embodiment of the invention.

The frame generator 15 of the transmitter 1 is, like the second embodiment, designed to produce frames, as clearly shown in FIG. 7, each having two status flags added to leading and trailing ends of a data section. The data section of each frame is broken down into a plurality of blocks each of which holds therein a data item(s) and has a block flag as a block ID (identification) code which is used, as described later in detail, in determining the identity of the data item between the blocks.

Referring to FIG. 7, the data section of each of the frames 131 and 132 is made up of a series of k blocks. The blocks of the frame 131 have the block flags $SF_{11}$ to $SF_{1k}$, respectively. Similarly, the blocks of the frame 132 have the block flags $SF_{21}$ to $SF_{2k}$, respectively. Each of the block flags $SF_{11}$ to $SF_{1k}$ of the frame 131 corresponds to one of the block flags $SF_{21}$ to $SF_{2k}$ of the fame 132. Specifically, if the first block of the data section of the frame 131 is identical in data item with the first block of the data section of the frame 132, the block flag $SF_{11}$ agrees with the block flag $SF_{21}$.

In operation, when the receiver 2 has started to receive the frame 132 following reception of the frame 131, it compares, like the second embodiment, the status flag $SF_2$ of the frame 132 with the status flag $SF_1$ of the frame 131. If it is determined that the status flags $SF_1$ and $SF_2$ are different from each other, the receiver 2 works to compare data of the frame 132 with that of the frame 131 on a block basis.

Figure 8A:
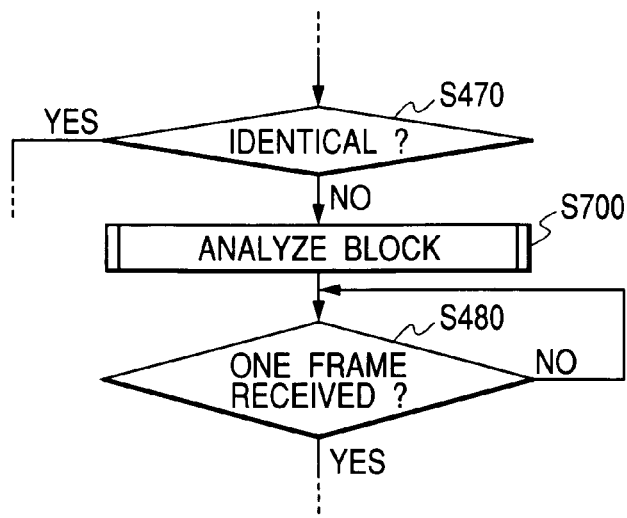
FIGS. 8(a) and 8(b) show a flowchart of a sub-program executed by a receiver of the third embodiment of the invention.

The above block-based comparison is accomplished using the block flags added to heads of the blocks. For instance, if the block flag $SF_{21}$ of the first block of the frame 132 is compared with the block flag $SF_{11}$ of the first block of the frame 131, and it is determined that they are identical with each other, the receiver 2 decides that the first block of the frame 132 is identical in data item with the first block of the frame 131 and stops decoding the first block of the frame 132. This operation is performed on each block in step 700, as illustrated in FIG. 8(a), provided between steps 470 and 480 of FIG. 6. Specifically, after the receiver 2 has received one frame completely and started to receive a following frame, if they are different in data from each other, the receiver 2 executes step 700.

Figure 8B:
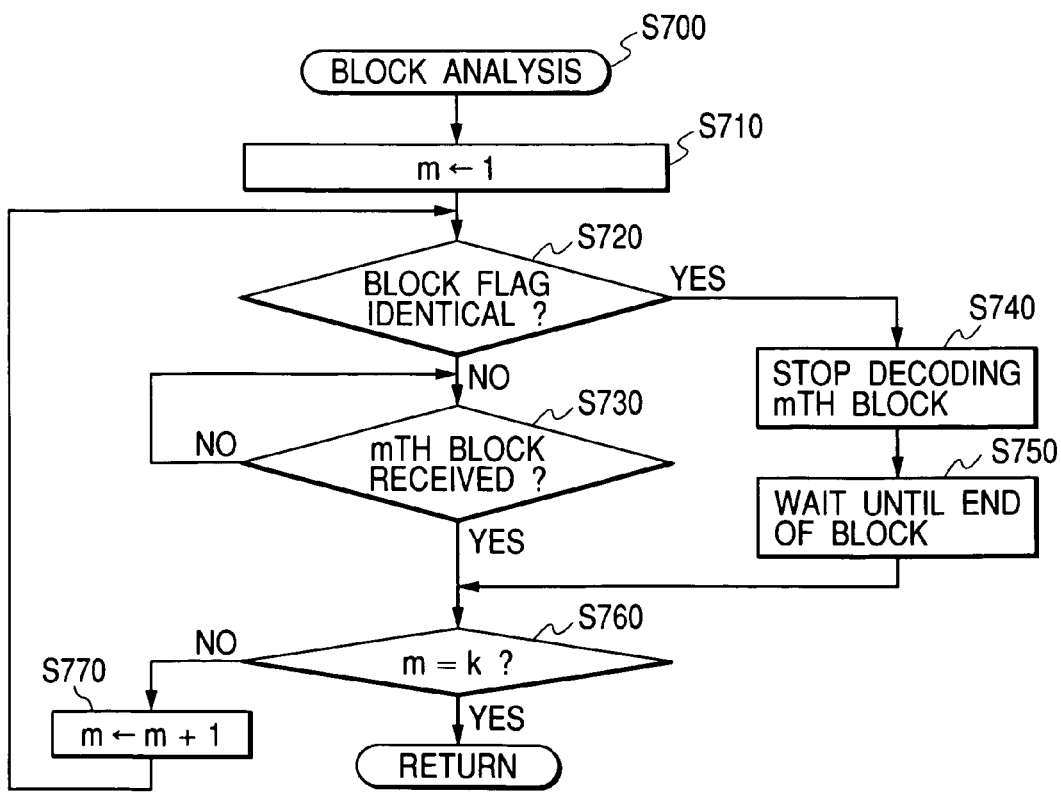

After entering step 700, the routine proceeds, as shown in FIG. 8(b), to step 710 wherein a count value m of a counter installed in the microcomputer 22 is set to one (1) which indicates the number of each block. The routine proceeds to step 720 wherein it is determined whether the block flag appended to the mth block of the frame now being received (m=1 in this cycle) is identical with that appended to the mth block of a frame received previously or not. If a NO answer is obtained meaning that they are not identical, then the routine proceeds to step 730 wherein it is determined whether the mth block of the frame has been received completely or not. If a NO answer is obtained, the routine repeats step 730 and waits for completion of reception of the mth block.

Afterwards, the routine proceeds to step 760 wherein it is determined whether the count value m has reached a total number k of the blocks of the frame or not, that is, whether the operations following step 710 have been performed on up to the kth block of the frame or not. If a YES answer is obtained meaning that the operations have been performed on all of the blocks of the frame, then the routine proceeds to step 480 in FIG. 8(a). Alternatively, if a NO answer is obtained, then the routine proceeds to step 770 wherein the count value m is incremented by one (1). The routine then returns back to step 720.

Alternatively, if a YES answer is obtained in step 720 meaning that the block flag added to the mth block of the frame now being received is identical with that added to the mth block of the frame received previously, then the routine proceeds to step 740 wherein the microcomputer 2 decides that the mth block of the frame now being received is identical in data item with the mth block of the frame received previously and prohibits the decoder 27 from decoding the mth block of the frame. Specifically, the input information selector 26 outputs a signal indicating that the mth block of the frame now being received is identical in data item with the mth block of the frame received previously to the decoder 27. The decoder 27 is responsive to the input to provide the same data item as that produced by decoding the mth block of the previous frame to the ECU 3.

The routine proceeds to step 750 and waits for completion of reception of the mth block. Afterwards, the routine proceeds to step 760. In step 740, the receiver 2 may alternatively stop receiving the mth block.

As apparent from the above discussion, in a case where the receiver 2 has started to receive a frame whose status flag is different from that stored in the previous flag storage 25 meaning that the frame now being received is different in data as a whole from that received previously, the receiver 2 works to determine whether the mth block of the frame now being received has the same block flag as that of the mth block of the previous frame or not, that is, whether the mth block of the frame now being received is identical in data item with the mth block of the previous frame or not. If a positive answer is obtained, the receiver 2 stops decoding the data item in the mth block of the latest frame and provides a corresponding data item decoded and stored previously to the ECU 3. This results in a greatly decreased operating load on the decoder 27, thus leading to a decrease in power consumption of the receiver 2.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments witch can be embodied without departing from the principle of the invention as set forth in the appended claims.

For instance, if the receiver 2 received a previous frame the middle thereof, and a frame now being received agrees in the status flag with the previous frame, the system of the second embodiment, as described above, works to combine leading and trailing portions of the frames to produce a replica thereof, but it may also be designed to check the replica for errors such as bit emissions.

Figure 9A:
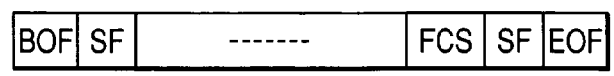
FIG. 9(a) is an illustration which shows structures of frames to be outputted from a transmitter of a modified embodiment of the invention.
Figure 9B:
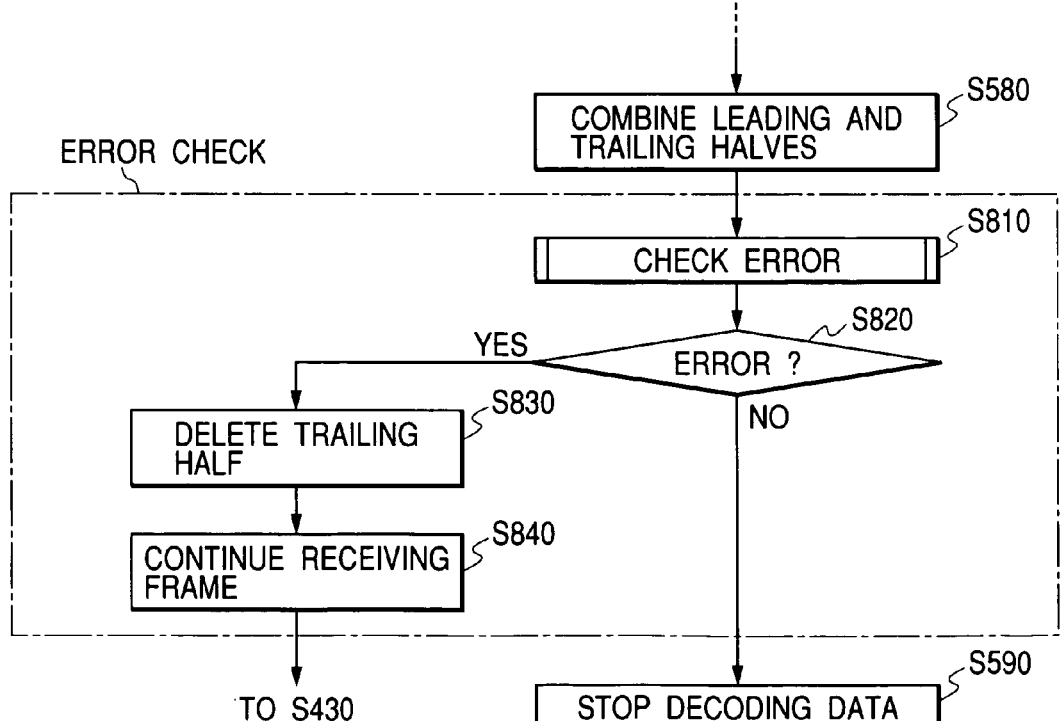
FIG. 9(b) is a flowchart of a program executed by a receiver of a modified embodiment of the invention.

Such a check may be made by using, as shown in FIG. 9(*a*), a frame check sequence (FCS) appended to a leading end of the rear status flag SF of a frame. As the FCS, cyclic redundancy check (CRC) code is well known.

FIG. 9(*b*) shows, as an example, an error check program using the FCS which may be executed between steps 580 and 590 of FIG. 6.

In step 810, a given error check is made using the FCS. The routine proceeds to step 820 wherein it is determined whether any error is detected or not. If a NO answer is obtained, the routine proceeds to step 590 as described above. Alternatively, if a YES answer is obtained, then the routine proceeds to step 830 wherein the frame trailing half as acquired in step 530 is invalidated or deleted. The routine proceeds to step 840 wherein the microcomputer 2 makes the receiving circuit 21 continue to receive the frame. The routine proceeds to step 430 as described in FIG. 6.

Use of the above error check results in improved reliability of the replica of the frame. The error check may also be made in the first or third embodiment using the FCS.

The keyless entry system of the first embodiment may also be designed, like the second embodiment, to combine portions of two same frames inputted in sequence to the receiver 2 to produce a replica thereof if the receiver 2 has received a preceding one of the frames from the middle thereof and also received the status flag thereof. The receiver 2 is adapted to receive a preceding one of the frames up to the status flag thereof for comparison with the status flag of the preceding frame. If the status flags of the frames are identical, the receiver 2 extracts only a portion of the following frame which is to be combined with the received portion of the preceding frame and produce a duplication of the frames.

The determination of identify between data of preceding and following frames is, as described above, achieved by comparing the status flags thereof, but however, it may alternatively be accomplished using status flags designed to indicate the identify of the frames. For instance, the transmitter 1 may be adapted to compare a frame before transmitting it with an immediately preceding frame which has already been outputted and append a status flag to the former which is expressed in a logical-one bit if the both frames are identical in data or a logical-zero bit if not. This eliminates the need for the receiver 2 to compare the status flags of the frames after receiving them. Specifically, the determination of identify between data of the received frames may be accomplished only by checking the status flags appended thereto.

The receiver 2 of each embodiment is designed to be turned on intermittently, but however, the invention may be used with all varieties of communication systems working to transmit a sequence of frames including the same data regardless of whether the receiver is enabled intermittently or continuously.

What is claimed is:

1. A transmission system comprising:

a transmitter working to produce and transmit a plurality of data on a frame basis, said transmitter being designed to append a frame identification code to a leading portion and a trailing portion of each frame for identifying the data in the frame; and a receiver working to receive the frames outputted from said transmitter to decode the data in each of the frames, said receiver monitoring the frame identification codes and determining whether a second received frame that is one of the frames received last is identical in data with a first received frame that is one of the frames received preceding the second received frame or not, when said receiver has received the first received frame from a middle portion thereof and started to receive the second received frame, and if it is determined that the second received frame is identical with the first received frame, said receiver combining a frame trailing portion that is a section of the first received frame from the middle portion to a trailing end thereof with a frame leading portion that is a section of the second received frame from a leading end to a portion thereof corresponding to a portion of the first received frame preceding the middle portion to produce a duplication of the first and second received frames.

2. A transmission system as set forth in claim 1, wherein when a first transmission frame that is one of the frames before transmitted by said transmitter is identical in data with a second transmission frame that is one of the frames having been transmitted already, said transmitter appending the frame identification codes to the leading and trailing portions of the first transmission frame which are identical with the frame identification codes appended to the second transmission frame, and wherein when said receiver has received the second transmission frame as the first received frame and started to receive the first transmission frame from a middle portion thereof as the second received frame, said receiver comparing the frame identification code appended to the trailing portion of the first received frame with that appended to the leading portion of the second received frame and, if the former and latter frame identification codes are identical with each other, producing the duplication of the first and second received frames.

3. A transmission system as set forth in claim 1, wherein said transmitter also appends an error check code to each of the frames, and wherein said receiver checks the duplication of the first and second received frames for an error using the error check code, when the error is detected, said receiver invalidating the duplication and continuing to receive a portion of the second received from following the frame leading portion thereof.

4. A receiver for use in a transmission system comprising:
   a receiving circuit working to receive data transmitted from a transmitter on a frame basis, each frame having a frame identification code appended to a leading portion and a trailing portion thereof for identifying the data in the frame;
   a decoder working to decode the data in each frame received by said receiving circuit and output the decoded data;
   a frame identify-determining circuit which, when said receiving circuit has received one of the frames from a middle portion thereof and started to receive a following one of the frame, determines whether a second received frame that is the following one of the frames is identical in data with a second received frame that is the one of the frames received preceding the second received frame or not using the frame identification codes appended to the first and second received fames;
   a frame holding circuit working to hold a frame trailing portion that is a section of the first received frame from the middle portion to a trailing end thereof; and
   a frame reproducing circuit which, when said frame identify-determining circuit determines that the second received frame is identical with the first received frame, combines a frame trailing portion that is a section of the first received frame from the middle portion to a trailing end thereof with a frame leading portion that is a section of the second received frame from a leading end to a portion thereof corresponding to a portion of the first received frame preceding the middle portion to produce a duplication of the first and second received frames which is to be decoded by said decoder.

5. A receiver as set forth in claim 4, wherein when a first transmission frame that is one of the frames before transmitted from the transmitter is identical in data with a second transmission frame that is one of the frames having been transmitted already, the frame identification codes are appended to the leading and trailing portions of the first transmission frame which are identical with the frame identification codes appended to the second transmission frame, and wherein when said receiving circuit has received the second transmission frame as the first received frame and started to receive the first transmission frame from a middle portion thereof as the second received frame, said frame identify-determining circuit compares the frame identification code appended to the trailing portion of the first received frame with that appended to the leading portion of the second received frame, if it is determined that the former and latter frame identification codes are identical with each other, said frame reproducing circuit producing the duplication of the first and second received frames.

6. A receiver as set forth in claim 4, wherein an error check code is also appended to each of the frames, and further comprising an error checking circuit working to check the duplication of the first and second received frames for an error using the error check code, and wherein when the error is detected, the duplication is invalidated, and said receiving circuit continues to receive a portion of the second received from following the frame leading portion thereof.

* * * * *